United States Patent
Concessi

(10) Patent No.: US 10,609,488 B1
(45) Date of Patent: Mar. 31, 2020

(54) DUAL-COIL (DIFFERENTIAL DRIVE) TACTILE TRANSDUCER

(71) Applicant: Harman International Industries, Incorporated, Stamford, CT (US)

(72) Inventor: Kyle Concessi, Wixom, MI (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 16/146,209

(22) Filed: Sep. 28, 2018

(51) Int. Cl.
*H04R 9/02* (2006.01)
*G06F 3/01* (2006.01)

(52) U.S. Cl.
CPC ............. *H04R 9/025* (2013.01); *G06F 3/016* (2013.01)

(58) Field of Classification Search
CPC ................................ H04R 9/025; G06F 3/016
USPC ......................................................... 381/412
See application file for complete search history.

(56) References Cited

U.S. PATENT DOCUMENTS

| | | | | |
|---|---|---|---|---|
| 4,783,824 A * | 11/1988 | Kobayashi | ............. | H04R 9/025 381/402 |
| 5,937,076 A * | 8/1999 | Tanabe | ..................... | H04R 9/04 381/400 |
| 6,668,065 B2 * | 12/2003 | Lee | ......................... | H04R 11/02 381/151 |
| 7,418,108 B2 * | 8/2008 | Oser | ......................... | A47C 7/72 381/401 |
| 8,325,943 B2 | 12/2012 | Button et al. | | |
| 8,681,092 B2 * | 3/2014 | Harada | .................... | G06F 3/016 310/12.19 |
| 9,173,035 B2 * | 10/2015 | Button | ...................... | H04R 1/00 |
| 9,282,409 B2 * | 3/2016 | Lee | ............................ | B06B 3/00 |
| 9,485,587 B1 * | 11/2016 | Skramstad | ............. | H04R 9/046 |
| 9,736,592 B2 * | 8/2017 | Daley | ....................... | H04R 9/06 |
| 9,918,154 B2 * | 3/2018 | Timothy | .................. | H04R 1/10 |
| 9,942,663 B1 * | 4/2018 | Salvatti | .................. | H04R 9/025 |
| 2004/0156527 A1 * | 8/2004 | Stiles | ....................... | H04R 9/063 381/412 |
| 2006/0126885 A1 * | 6/2006 | Combest | ................ | H04R 9/063 381/401 |
| 2006/0222200 A1 * | 10/2006 | Nagaoka | ................ | H04R 9/025 381/412 |
| 2007/0206830 A1 * | 9/2007 | Usuki | ..................... | H04R 9/025 381/412 |
| 2008/0024440 A1 * | 1/2008 | Olien | ...................... | B60K 37/06 345/156 |
| 2014/0226849 A1 * | 8/2014 | Porter | .................... | H04R 9/025 381/412 |
| 2019/0006926 A1 * | 1/2019 | Zhu | ......................... | H02K 33/02 |

\* cited by examiner

*Primary Examiner* — Oyesola C Ojo
(74) *Attorney, Agent, or Firm* — Brooks Kushman P.C.

(57) ABSTRACT

In at least one embodiment, a tactile transducer including a housing, a first voice coil and a magnetic assembly is provided. The first voice coil includes an electrically conductive wire being orientated in a first winding direction to generate a first magnetic field. The magnetic assembly is positioned within the housing. The magnetic assembly is configured to move within the housing to generate a tactile output and to repel against the first voice coil based on a polarity of the first magnetic field as the magnetic assembly moves toward the first voice coil to prevent contact of a first portion of the magnetic assembly with a first side of the housing.

12 Claims, 3 Drawing Sheets

DUAL-COIL (DIFFERENTIAL DRIVE) TACTILE TRANSDUCER

TECHNICAL FIELD

Aspects disclosed herein generally related to a dual-coil, differential drive, tactile transducer.

BACKGROUND

U.S. Pat. No. 8,325,943 to Button et al. provides a dual-coil, dual magnetic gap electromagnetic transducer, where each voice coil is wired to include separate leads so that each individual voice coil may be driven by a separate amplifier or by a separate bridged amplifier. Signal processing may further be utilized to increase the output of the loudspeaker. This aspect may achieve extreme excursion without extreme distortion and to provide for alternative voice coil designs to address common problems with dual-coil, dual magnetic gap transducers, including, but not limited to, heat generation.

SUMMARY

In at least one embodiment, a tactile transducer including a housing, a first voice coil and a magnetic assembly is provided. The first voice coil includes an electrically conductive wire being orientated in a first winding direction to generate a first magnetic field. The magnetic assembly is positioned within the housing. The magnetic assembly is configured to move within the housing to generate a tactile output and to repel against the first voice coil based on a polarity of the first magnetic field as the magnetic assembly moves toward the first voice coil to prevent contact of a first portion of the magnetic assembly with a first side of the housing.

In at least another embodiment, a tactile transducer including a housing, a first voice coil and a magnetic assembly is provided. The first voice coil includes a first winding direction to generate a first magnetic field. The magnetic assembly is positioned within the housing. The magnetic assembly is configured to move within the housing to generate a tactile output and to repel against the first voice coil based on a polarity of the first magnetic field as the magnetic assembly moves toward the first voice coil to prevent contact of a first portion of the magnetic assembly with a first side of the housing.

In at least another embodiment, a tactile transducer including a housing, a first voice coil and a magnetic assembly is provided. The first voice coil includes a first winding direction to generate a first magnetic field. The magnetic assembly is positioned within the housing. The magnetic assembly is configured to move within the housing to generate a tactile output and to repel against the first voice coil based on a polarity of the first magnetic field as the magnetic assembly moves toward the first voice coil to prevent contact of a first portion of the magnetic assembly with a first side of the housing.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
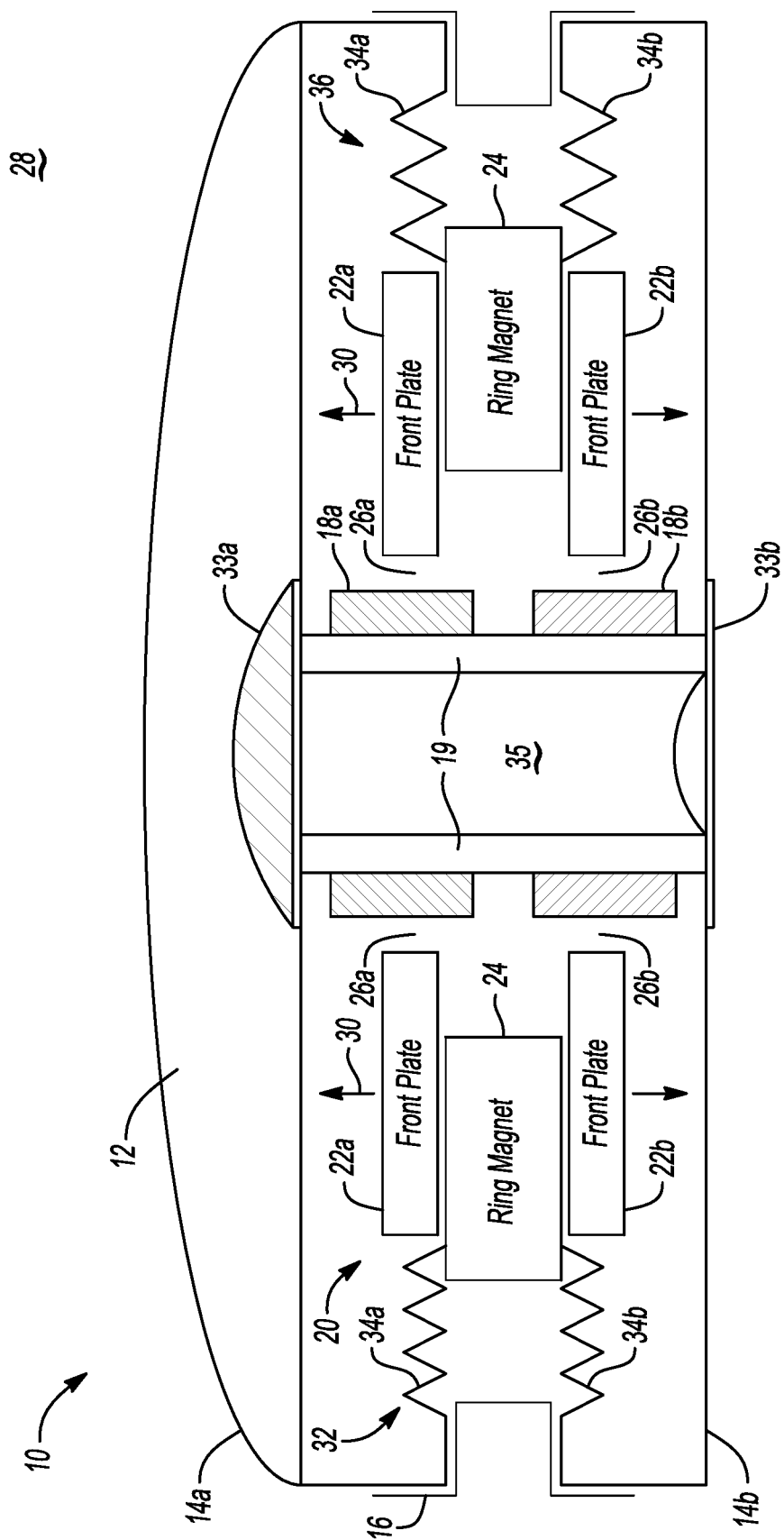
FIG. 1 generally illustrates a cross-sectional view of a bass tactile transducer in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

U.S. Ser. No. 15/864,401 ("the '401 application) to Trestain provides an apparatus for providing a tactile output associated with an audio output. The apparatus includes a head unit that is coupled to a plurality of tactile transducers with each tactile transducer being positioned in a seat of a vehicle. The head unit is configured to receive a command indicative of a desired tactile feedback for a seat of the vehicle, the desired tactile feedback is associated with an audio output that is played back by one or more speakers in the vehicle. The head unit is further configured to transmit a control signal indicative of the desired tactile feedback to be provided by a tactile transducer in the seat of the vehicle such that the tactile transducer generates the desired tactile feedback at the seat while the one or more speakers in the vehicle playback the audio output.

The '401 application provides user with the ability to select a corresponding bass tactile feedback associated with an audio output signal in a vehicle listening environment. This creates a better user experience for the user. In addition to the audio bass experience, each seat in the vehicle can tailor their tactile bass experience. Therefore, a user who likes to feel their seats rumble excessively can set the bass tactile level accordingly. Conversely, a user who desires a lesser physical experience can set their bass tactile level accordingly.

Specifically, a tactile transducer (or shaker) may be installed in each seating location in the vehicle. The tactile transducer can be installed either in the back or under the seat or a combination of both. It may be advantageous to attach the tactile transducer to the seat frame so that the tactile sensation (or vibration) is evenly distributed on the frame. The seat mounting locations may be physically separated from one another to prevent disturbance to other users (or passengers) in the vehicle. An example of this may include bench seating. The tactile transducer may provide little to no audible output. Specifically, the tactile transducer may provide the sensation to the passenger that more bass (or low frequency) is present in the audio output by virtue of the presence of the tactile output.

The tactile output of the tactile transducer may be tuned to compliment the audio system. During the tuning operation, a user may sit in the vehicle while the audio system outputs tones at various bass frequencies (e.g., 20-70 Hz) so that the frequencies provide the same amount of vibration. The tuning operation may be performed with an accelerometer.

The user can control the amount of vibration (or tactile feedback) provided by the tactile transducer for a low frequency signal that is in the range of 20-70 Hz. The tactile transducer may enable the user to control the tactile feedback for higher or lower frequencies than the noted range based on the overall tuning of system. The apparatus provides adjustable tactile control for each tactile transducer that is located at a corresponding seat (i.e., personalization). An amplifier may be provided for each tactile transducer to provide gain control for the tactile output provided by the tactile transducer. For gain control, this aspect corresponds to a correlation between volume control and the tactile feedback. If there is more gain applied (i.e., more volume being applied), then the tactile transducer provides more vibrations. If there is less gain applied (i.e., less volume being applied), then the tactile transducer provides less vibrations. Various switching devices such as physical knobs positioned proximate to a seat, mobile devices, individualized touch screens, or a user interface on a head unit may enable the user to control the amount of tactile feedback provided by the tactile transducer.

It is recognized that such tactile transducers may experience excessive excursion and hard bottoming. For example, various magnets or other components positioned internally within the tactile transducer may move vertically (i.e., up and down) (i.e., when both voice coils are energized) and physically contact a bottom portion of a housing that houses the magnets. In this case, the magnetic components experience a high degree of excursion. Such excursion and hard bottoming not only affects the lifespan of the tactile transducer, but also generates an unpleasant audible output that interferes with the audio data that the user seeks to listen to for purposes of entertainment. To mitigate the high degree of excursion and bottoming out, embodiments disclosed herein provide, but not limited to, opposing voice coils that are wound differently from one another to interface with polarized magnets such that when one voice coil is energized, the magnets will move in one direction along a vertical axis until the magnets approach the other voice coil which repels the movement of the magnet into an opposing direction on the vertical axis in response to the other voice coil being energized. These aspects and others will be discussed in more detail herein.

FIG. 1 generally illustrates a cross-sectional view of a bass tactile transducer (or shaker) 10 in accordance with one embodiment. The transducer 10 generally includes a housing 12 that may be shaped in the form of a cylinder. It is recognized that the shape of the housing 12 or the transducer 10 may vary based on a desired implementation. The housing 12 generally includes a first cover plate 14a and a second cover plate 14b. A joining ring 16 couples the first cover plate 14a to the second cover plate 14b. As shown, the joining ring 16 is positioned on an outer perimeter of the transducer 10. The geometry of the joining ring 16 may vary based on the desired implementation. The joining ring 16 may be made of plastic, steel, or other suitable material. The joining ring 16 may couple the transducer 10 to a suitable location in a vehicle such as a backrest or a seat bottom of a vehicle seat (not shown). The vehicle seat may include various mounting features to enable coupling with the transducer 10 such as screws, through holes, mounting ear(s), mounting feet, etc.

The transducer 10 further includes a first voice coil 18a, a second voice coil 18b, and a magnetic assembly 20. Each of the first voice coil 18a and the second voice coil 18b are wound around a center post 19. In general, the first voice coil 18a includes a first winding (or a first electrically conductive wire) that is arranged or wound in a first direction. The second voice coil 18b includes a second winding (or a second electrically conductive wire) that is arranged or wound in a second direction. It is recognized that the first voice coil 18a and the second voice coil 18b may each have the same wire but wound in different directions. Alternatively, the first voice coil 18a and the second voice coil 18b may each have a separate wire from one another. The first direction of the first winding of the first voice coil 18a is different than the second direction of the second winding of the second voice coil 18b. This aspect causes the first voice coil 18a to have a different polarity than that of the second voice coil 18b when the wire(s) of the first voice coil 18a and the second voice coil 18b are energized. Thus, the first voice coil 18a is out of phase with the second voice coil 18b when the wire(s) of the first voice coil 18a and the second voice coil 18b are energized.

The first voice coil 18a and the second voice coil 18b are energized in response to receiving an incoming alternating current (AC) signal. The first voice coil 18a generates a first alternating magnetic field and the second voice coil 18b generates a second alternating magnetic field in response to the AC signal. It is recognized that the incoming AC signal causes the first and second alternating magnetic fields to switch polarity which flips in accordance to the alternating waveform (e.g., positive and negative waveform) of the incoming AC signal. However, due to the first winding of the first voice coil 18a being out of phase (or opposite) with the second winding of the second voice coil 18b, the polarity of the first voice coil 18a will be opposite to the polarity of the second voice coil 18b when the first and the second voice coils 18a and 18b are energized irrespective of the flipping between the positive and negative waveform of the incoming AC signal.

The magnetic assembly 20 is positioned about the first voice coil 18a and the second voice coil 18b. The first front plate 22a and the first voice coil 18a are positioned in a first air gap 26a. The second front plate 22b and the second voice coil 18b are positioned in a second air gap 26b. The center post 19 may be made of solid steel. The magnetic assembly 20 includes a first front plate 22a, a second front plate 22b, and a ring magnet 24. The ring magnet 24 is positioned between the first front plate 22a and the second front plate 22b. The shape of the first front plate 22a and the second front plate 22b may be similar to one another. While the first front plate 22a and the second front plate 22b may not be magnetic, the first front plate 22a and the second front plate 22b are made of solid steel and serve as conductors for the magnetic field of the ring magnet 24 (once energized with a given polarity).

The ring magnet 24 may be made of ceramic or neodymium and includes a positive pole (e.g., south pole) and a negative pole (e.g., north pole). In general, an amplifier 28 is generally configured to provide an electrical current (or the AC signal) to the wire(s) of the first and the second voice coils 18a, 18b. As noted above, the first voice coil 18a and the second voice coil 18b each generate an alternating magnetic field in response to the AC signal and the direction of the magnetic flux is based on the winding direction of the wire(s) around the first voice coil 18a and the second voice coil 18b. When energized, the second voice coil 18b provides the second alternating magnetic field which crosses over the air gap 26b and interacts with a fixed magnetic field that is generated by the second front plate 22b, the ring magnet 24, and the first front plate 22a. From the magnetic assembly 20, the fixed magnetic field flows over the air gap 26a and interacts with the first alternating magnetic field generated by the first voice coil 18a. The center post 19 is used as a flux return path of the DC magnetic field.

Thus, as seen, the first voice coil 18a, the second voice coil 18b, the first front plate 22a, the second front plate 22b, and the center post 19 form a magnetic circuit. The travel of the magnetic fields within the transducer 10 causes the magnetic assembly 20 to vibrate, linearly, vertically up and down, along a first axis 30. The vibration of the magnetic assembly 20 provides the tactile feedback and is based on the amount of current provided by the amplifier 28 to the first and second voice coils 18a, 18b via the AC signal. Such vertical movement or oscillation/vibration causes the transducer 10 to generate a low frequency signal that is in the range of 20-70 Hz. Such a signal is generally inaudible to the listener when the transducer 10 is embedded in a vehicle seat.

The transducer 10 includes a suspension assembly 32 that is coupled to the magnetic assembly 20. The suspension assembly 32 minimizes rocking (or tilting) of the magnetic assembly 20 about the center post 19 as the magnetic assembly 20 moves about the first axis 30 The suspension assembly 32 includes a first spider 34a and optionally a second spider 34b. The first spider 34a is attached to a top side of the ring magnet 24 and to the joining ring 16. It is recognized that the first spider 34a may be attached to the first front plate 22 instead of to the ring magnet 24. As noted above, the second spider 34b may be optional and may be utilized within the transducer 10 generally based on the size and weight of the overall magnetic assembly 20 (e.g., the first front plate 22a, the second front plate 22b, and the ring magnet 24).

The second spider 34b is attached to a bottom side of the ring magnet 24 and to the joining ring 16. It is recognized that the second spider 34b may be attached to directly to the second front plate 22b. The first spider 34a and the second spider 34b may oppose one another. In other words, the shapes of first spider 34a and the second spider 34b are symmetrically opposite with one another (or are a mirrored image of one another). The first spider 34a and the second spider 34b assist in mitigating rocking of the magnetic assembly 20. As noted above, the use of two spiders (or the first and second spider 34a, 34b) is optional and is based on the mass of the magnetic assembly 20. The first spider 34a and the second spider 34b assist in preventing rocking and provide improved support particularly if the mass of the magnetic assembly 20 is large. If the mass of the magnetic assembly 20 is generally low, then the first spider 34a also prevents the magnetic assembly 20 from rocking and supports the magnetic assembly 20 within the transducer 10. Each of the first cover plate 14a, the second cover plate 14b, and the joining ring 16 may be constructed of aluminum to assist in dissipating heat from the first and the second voice coils 18a and 18b as the first and second voice coils 18a and 18b receive electrical current from the amplifier 28.

A first dust cap 33a and a second dust cap 33b is provided and covers an interior cavity 35 of the center post 19. The first dust cap 33a and the second dust cap 33b prevents magnetic material or particles from entering into the interior cavity 35 of the center post 19. Any magnetic material that enters into the interior cavity 35 of the center post 19 may cause the transducer 10 to generate extraneous (or undesirable) noise. The first and the second dust caps 33a and 33b may be implemented as a cloth, plastic, metals, etc. or any other material that prevents small pieces of debris from entering into the interior cavity 35 of the center post 19. The first duct cap 33a is generally positioned on a top side of the transducer 10. The second dust cap 33b is generally positioned on a bottom side of the transducer 10 and covers the interior cavity 35 of the center post 19. The first dust cap 33a may be glued to the first cover plate 14a over the interior cavity 35 of the center post 19. The second dust cap 33b may be glued to the second cover plate 14b to cover the interior cavity 35 of the center post 19. In general, as the transducer 10 is installed in the vehicle, metal shavings may be present and may be attracted to the DC magnetic field generated within the transducer 10.

Figure 2:
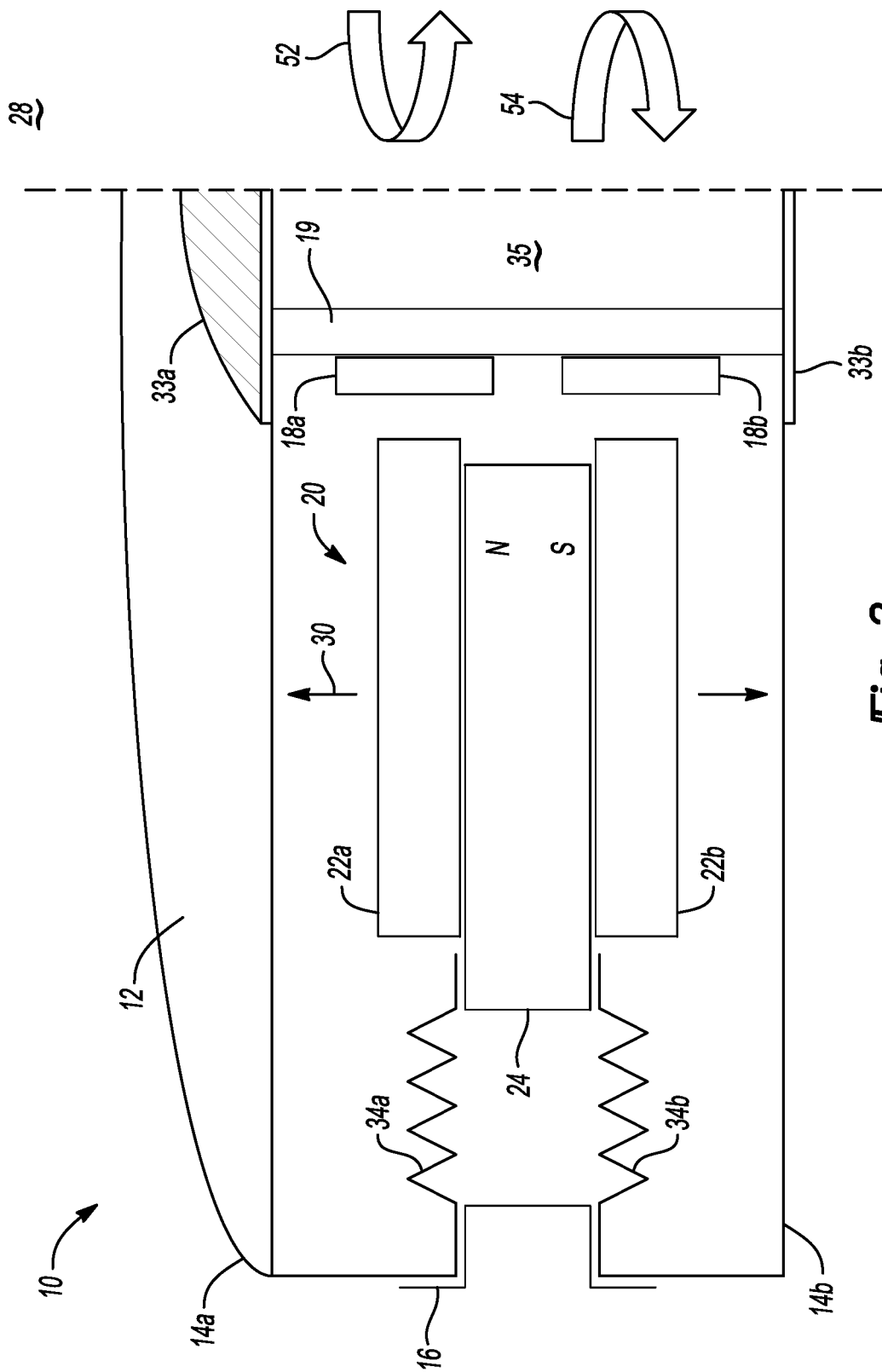
FIG. 2 generally depicts another cross-sectional view of the transducer in accordance to one embodiment.

As noted above, tactile transducers may suffer from over excursion and bottoming out. However, the transducer 10 mitigates these issues as will be described hereafter in connection with FIGS. 2 and 3. FIG. 2 provides another cross-sectional view of the transducer 10. As also noted above, the first voice coil 18a and the second voice coil 18b generate the first alternating magnetic field and the second alternating magnetic field, respectively, in response to the AC signal. For example, the amplifier 28 provides the AC signal to the first voice coil 18a and the second voice coil 18b to initiate the flow of the first and second alternating magnetic fields, respectively, in the magnetic assembly 20. The first voice coil 18a includes a wire orientated in a first winding direction to cause the first alternating magnetic field to flow or travel in a direction 52 (e.g., counterclockwise) around the center post 19. The second voice coil 18b includes a wire-orientated in a second winding direction to cause the second alternating magnetic field to flow or travel in a direction 54 (e.g., clockwise) around the center post 19. FIG. 2 illustrates that the first winding direction of the first voice coil 18a is opposite to the second winding direction of the second voice coil 18b.

In addition, FIG. 2 illustrates the polarization of the ring magnet 24. For example, the ring magnet 24 (which can be ferrite or neodymium) is magnetized (i.e., north-south or south-north). The ring magnet 24 generates a fixed direct current ("DC") magnetic field that establishes a polarity based on the manner in which the ring magnet 24 is magnetized. The ring magnet 24 as depicted in FIG. 2 provides a north-south magnetization (i.e., north is positioned on topside of the ring magnet 24 and south is positioned on bottom side of the ring magnet 24). The magnetic assembly 20, which is suspended, moves up and down along the first axis 30 when a fixed DC magnetic field (or fixed DC magnetic flux) interacts with the first alternating magnetic field generated from the first voice coil 18a and when the fixed DC magnetic field interacts with the second alternating magnetic field generated from the second voice coil 18b. The magnetic assembly 20 (e.g., the first front plate 22a, the second front plate 22b, and the ring magnet 24) generally moves up and down along a first axis 30 when the first voice coil 18a and the second voice coil 18b are energized in response to the AC signal from the amplifier 28.

Figure 3:
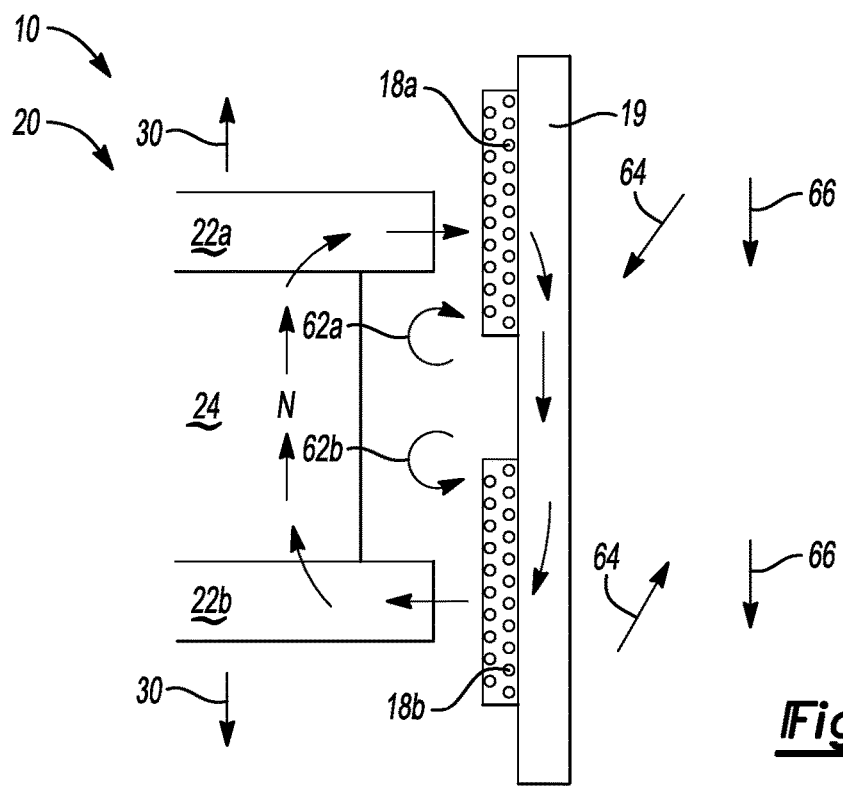
FIG. 3 generally depicts another cross-section view of the transducer in accordance to one embodiment.

FIG. 3 generally depicts another cross-sectional view of the transducer 10 in accordance to one embodiment. As noted above, the magnetic assembly 20 generates the fixed DC magnetic field (which is now illustrated as element 60 in FIG. 3). The fixed DC magnetic field 60 is polarized and travels from a south to north orientation through the magnetic assembly 20. The fixed DC magnetic field 60 travels clockwise and interacts with the first alternating magnetic field (which is now illustrated as element 62a in FIG. 3) as generated by the first voice coil 18a. Current flows in a flow direction 64 through the center post 19 and the second voice coil 18b generates the second alternating magnetic field (which is now illustrated as element 62b). Thus, the magnetic flow within the transducer 10 (e.g., the interaction of the DC fixed flux field 60 with the first alternating magnetic field 62a and the second alternating magnetic field 62b) causes the magnetic assembly 20 to travel in a downward direction (see motion direction of magnetic assembly as illustrated as element 66) about the first axis 30.

As the first front plate 22a travels away from the first voice coil 18a and travels closer to the second voice coil 18b (e.g., due to over excursion that may be attributed to a large amplitude on the incoming AC signal from the amplifier 28), the fixed DC magnetic field 60 being conducted from the first front plate 22a interacts with the second alternating magnetic field 62b. The polarity of the fixed DC magnetic field 60 is similar to the polarity of the second alternating magnetic field 62b (i.e., when the second voice coil 18b is energized by the AC signal). Therefore, given that the polarity of the fixed DC magnetic field 60 is similar to the polarity of the second alternating magnetic field 62b, the first front plate 22a repels against the second voice coil 18b and the first front plate 22a (in addition to ring magnet 24 and the second front plate 22b) and travels in an upward direction along the first axis 30 away from the second voice coil 18b. This condition creates a magnetic braking action which prevents the magnetic assembly 20 from bottoming out against the second cover plate 14b.

When the polarity of the incoming AC signal to the first and second voice coils 18a and 18b flips to an opposite polarity that is used to energize the first and the second voice coils 18a and 18b, the direction of the magnetic assembly 20 is upward along the first axis 30. As the second front plate 22b travels away from the second voice coil 18b and travels closer to the first voice coil 18a (e.g., due to over excursion that is attributed to a large amplitude on the incoming AC signal from the amplifier 28), the fixed DC magnetic field 60 being conducted from the second front plate 22b interacts with the first alternating magnetic field 62a of the first voice coil 18a. In this case, the polarity of the fixed DC magnetic field 60 is similar to the polarity of the first alternating magnetic field 62a. Therefore, given that the polarity of the fixed DC magnetic field 60 is similar to the polarity of the first alternating magnetic field 62a, the second front plate 22b repels against the first voice coil 18a and the second front plate 22b (in addition to ring magnet 24 and the first front plate 22a) and travels in downward direction along the first axis 30 away from the first voice coil 18a. This prevents the magnetic assembly 20 from contacting the first cover plate 14a.

Figure 4:
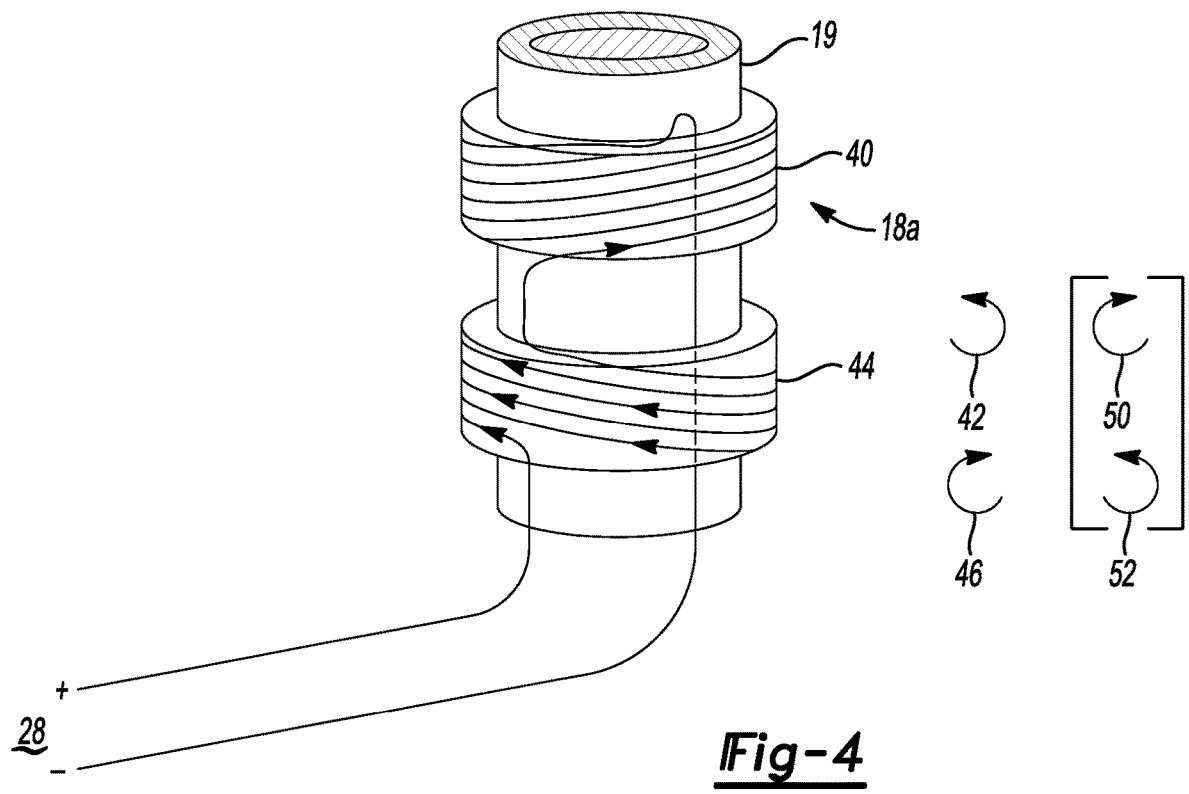
FIG. 4 generally depicts a detailed view of the first voice coil and the second voice coil positioned on a center post of the transducer in accordance to one embodiment.

FIG. 4 generally depicts a detailed view of the first voice coil 18a and the second voice coil 18b positioned on the center post 19 of the transducer 10 in accordance to one embodiment. It is recognized that the center post 19 may be a solid cylinder or a hollow cylinder. A first wire 40 forms the first voice coil 18a and is wrapped around the center post 19 in a first winding direction 42. As shown, the first winding direction 42 may be counterclockwise. A second wire forms the second voice coil 18b and is wrapped around the center post 19 in a second winding direction 44. A shown, the second winding direction 44 may be clockwise. It is recognized that the first winding direction 42 may be clockwise (e.g., see element 50) and that the second winding direction 44 may be counterclockwise (e.g., see element 52). As noted herein, the first winding direction 42 has a reverse orientation from the second winding direction 44 to provide magnetic braking with the magnetic assembly 20 to prevent over excursion.

In general, the tactile transducer 10 provides a magnetic braking action with respect to the magnetic assembly 20 due to the different winding directions of the first voice coil 18a and the second voice coil 18b. This implementation may reduce the potential for the magnetic assembly 20 to over-travel or "bottom out" with the first cover plate 14a and the second cover plate 14b. The transducer 10 as set forth herein may apply to a single amplifier channel that incorporates voice coils having opposite winding directions. It is recognized that the first voice coil 18a and the second voice coil 18b may be coupled to one another with a wire. Alternatively, the first voice coil 18a and the second voice coil 18b may be isolated from one another or wired separately from one another and that the first voice coil 18a and the second voice coil 18b may be power separately from two different amplifiers 28 (or amplifier channels). In this case, the first voice coil 18a and the second voice coil 18b may have a similar winding direction with one another, but the phase of the AC signals provided to each voice coil 18a and 18b may be 180 degrees out of phase with one another. The direction in which the magnetic assembly 20 generally moves depends on: (i) the phase of the signal (or polarity of the incoming AC signal) that is delivered to the voice coils 18a, 18b (e.g., from the amplifier 28 or a signal producing device), (ii) the polarity of the ring magnet 24 once magnetized, and (iii) the winding direction of the first voice coil 18a and the second voice coil 18b.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tactile transducer comprising:
   a housing;
   a center post;
   a first voice coil surrounding the center post and including an electrically conductive wire being orientated in a first winding direction to generate a first magnetic field;
   a second voice coil surrounding the center post;
   a magnetic assembly including:
      a first front plate that surrounds the first voice coil and the center post,
      a second front plate that surrounds the second voice coil and the center post, and
      a ring magnet positioned between the first front plate and the second front plate and surrounding the center post; and
   a first spider being coupled to an outer portion of one of the first front plate or the ring magnet and extending outwardly toward the housing directly from the one of the first front plate or the ring magnet,
   wherein the magnetic assembly is positioned within the housing and is configured to:
   move within the housing to generate a tactile output; and,
   repel against the first voice coil based on a polarity of the first magnetic field as the magnetic assembly moves toward the first voice coil to prevent contact of a first portion of the magnetic assembly with a first side of the housing.

2. The tactile transducer of claim 1, wherein the magnetic assembly generates a fixed magnetic field, and wherein the magnetic assembly repels against the first voice coil when the fixed magnetic field and the first magnetic field have similar polarities with one another.

3. The tactile transducer of claim 2 wherein the second voice coil includes the electrically conductive wire being oriented in a second winding direction to generate a second magnetic field, the second winding direction being different from the first winding direction.

4. The tactile transducer of claim 3, wherein the magnetic assembly is further configured to move linearly in relation to the first voice coil, the second voice coil, and the center post on a first axis within the housing to generate the tactile output.

5. The tactile transducer of claim 3, wherein the magnetic assembly is further configured to repel against the second magnetic field of the second voice coil based on a polarity of the second magnetic field as the magnetic assembly approaches the second voice coil to prevent contact of a second portion of the magnetic assembly with a second side of the housing.

6. The tactile transducer of claim 5, wherein the magnetic assembly repels against the second voice coil when the fixed magnetic field and the second magnetic field have similar polarities with one another.

7. The tactile transducer of claim 1 further comprising a second spider being coupled to an outer portion of one of the second front plate or the ring magnet and extending outwardly toward the housing directly from the one of the second front plate or the ring magnet.

8. A tactile transducer comprising:
a housing;
a center post;
a first voice coil surrounding the center post to generate a first magnetic field;
a second voice coil surrounding the center post;
a magnetic assembly including:
 a first front plate that surrounds the first voice coil and the center post,
 a second front plate that surrounds the second voice coil and the center post, and
 a ring magnet positioned between the first front plate and the second front plate; and
a first spider being coupled to an outer portion of one of the first front plate or the ring magnet and extending outwardly toward the housing directly from the one of the first front plate or the ring magnet,
wherein the magnetic assembly is positioned within the housing and is configured to:
 move within the housing to generate a tactile output; and
 repel against the first voice coil based on a polarity of the first magnetic field as the magnetic assembly moves toward the first voice coil to prevent contact of a first portion of the magnetic assembly with a first side of the housing.

9. The tactile transducer of claim 8, wherein the magnetic assembly generates a fixed magnetic field, and wherein the magnetic assembly repels against the first voice coil when the fixed magnetic field and the first magnetic field have similar polarities with one another.

10. The tactile transducer of claim 8, wherein the magnetic assembly is further configured to move linearly in relation to the first voice coil, the second voice coil, and the center post on a first axis within the housing to generate the tactile output.

11. The tactile transducer of claim 8 further comprising a second spider being coupled to an outer portion of one of the second front plate or the ring magnet and extending outwardly toward the housing directly from one of the second front plate or the ring magnet.

12. A tactile transducer comprising:
a housing;
a center post extending about a first axis;
a first voice coil surrounding the center post to generate a first magnetic field;
a magnetic assembly including:
 a first front plate that surrounds the first voice coil and the center post, and
 a ring magnet positioned proximate to the first front plate; and
a first spider being coupled to an outer portion of one of the first front plate or the ring magnet and extending outwardly toward the housing directly from the one of the first front plate or the ring magnet,
wherein the magnetic assembly is positioned within the housing and is configured to:
move within the housing to generate a tactile output; and
repel against the first voice coil based on a polarity of the first magnetic field as the magnetic assembly moves toward the first voice coil to prevent contact of a first portion of the magnetic assembly with a first side of the housing.

* * * * *